United States Patent
Koduri et al.

(10) Patent No.: US 7,612,783 B2
(45) Date of Patent: Nov. 3, 2009

(54) ADVANCED ANTI-ALIASING WITH MULTIPLE GRAPHICS PROCESSING UNITS

(75) Inventors: Rajabali M. Koduri, Santa Clara, CA (US); Gordon M. Elder, Los Altos, CA (US); Jeffrey A. Golds, Redwood City, CA (US)

(73) Assignee: ATI Technologies Inc., Ontario (CA)

( * ) Notice: Subject to any disclaimer, the term of this patent is extended or adjusted under 35 U.S.C. 154(b) by 421 days.

(21) Appl. No.: 11/429,078

(22) Filed: May 8, 2006

(65) Prior Publication Data
US 2007/0257935 A1 Nov. 8, 2007

(51) Int. Cl.
G09G 5/00 (2006.01)
G06F 15/16 (2006.01)

(52) U.S. Cl. .............. 345/611; 345/502; 345/503; 345/504

(58) Field of Classification Search ............ 345/611, 345/502–504
See application file for complete search history.

(56) References Cited

U.S. PATENT DOCUMENTS

| | | | |
|---|---|---|---|
| 5,379,129 A * | 1/1995 | Othmer et al. | 358/450 |
| 5,684,895 A | 11/1997 | Harrington | |
| 2004/0161146 A1 | 8/2004 | Van Hook et al. | |
| 2005/0190190 A1 | 9/2005 | Diard et al. | |

OTHER PUBLICATIONS

Matrox, 16x Fragment Antialiasing, 2002, pp. 1-9.*
Search Report and Written Opinion for International Application No. PCT/IB2007/001231 mailed Jul. 29, 2008, 15 pages.
Shen, B. et al., "Direct Feature Extraction From Compressed Images," SPIE, vol. 2670, Feb. 1, 1996, pp. 404-414.
Chiappetta, M., "NVIDIA Forceware v77.7x: New SLI AA Modes & Mainstream SLI", Hothardware, [Online], Jul. 19, 2005, pp. 1-8.
Lin, S. et al., "An Anti-Aliasing Method for Parallel Rendering", Computer Graphics International, Jun. 22, 1998, pp. 228-235.
Luigi, Atzori et al., "Adaptive Anisotropic Filtering (AAF) for Real-Time Visual Enhancement of MPEG-Coded Video Sequences", IEEE Transactions on Circuits and Systems for Video Technology, vol. 12, No. 5, May 2002, pp. 285- 298.
Communication Relating to the Results of the Partial International Search Report for International Application No. PCT/IB2007/001231, 4 pages.

* cited by examiner

*Primary Examiner*—Xiao M Wu
*Assistant Examiner*—Lillian K Ng
(74) *Attorney, Agent, or Firm*—Sterne, Kessler, Goldstein & Fox, PLLC.

(57) ABSTRACT

A method and apparatus for performing multisampling-based antialiasing in a system that includes first and second graphics processing unit (GPUs) that reduces the amount of data transferred between the GPUs and improves the efficiency with which such data is transferred. The first GPU renders a first version of a frame using a first multisampling pattern and the second GPU renders a second version of a frame in the second GPU using a second multisampling pattern. The second GPU identifies non-edge pixels in the second version of the frame. The pixels in the first version of the frame are then combined with only those pixels in the second version of the frame that have not been identified as non-edge pixels to generate a combined frame.

15 Claims, 8 Drawing Sheets

US 7,612,783 B2

ADVANCED ANTI-ALIASING WITH MULTIPLE GRAPHICS PROCESSING UNITS

BACKGROUND OF THE INVENTION

1. Field of the Invention

The invention is generally related to graphics processing systems. In particular, the present invention is related to a method for performing an anti-aliasing operation in a graphics processing system that implements multiple graphics processing units (GPUs).

2. Background

A known method for increasing the processing power of a graphics processing system is to operate multiple graphics processing units (GPUs) or video processing units (VPUs) in parallel, wherein each processing unit communicates with the other(s) over a common bus. Herein, the terms GPU and VPU are used interchangeably. One advantage of a multi-GPU system is that it can leverage existing microprocessor technology to achieve increased performance, thereby providing a less expensive alternative to investing in a new, faster GPU. A multi-GPU system achieves increased performance by performing calculations on multiple graphics elements in parallel.

One example of the use of a graphics processing system that utilizes multiple GPUs to provide improved performance is described in commonly-owned, co-pending U.S. patent application Ser. No. 11/140,156, entitled "Antialiasing Method and System" to Preetham et al., filed May 27, 2005, the entirety of which is incorporated by reference herein. The aforementioned application describes, in part, a graphics processing system in which multiple GPUs are operated in parallel to perform antialiasing on the same graphics frame.

Aliasing is a well-known effect created by the appearance of undesired artifacts of the rendering process in a displayed frame. Edge aliasing is a particular type of aliasing that creates stair steps in an edge that should look smooth. An existing antialiasing technique for alleviating the effect of edge aliasing is multisampling. Multisampling addresses edge aliasing by obtaining multiple samples of pixels that are used to generate intermediate points between pixels. The samples (or "sub-pixels") are averaged to determine the displayed pixel color value. The displayed edge in the multisampled image has a softened stair step effect.

The aforementioned U.S. patent application Ser. No. 11/140,156 describes a graphics processing system in which two GPUs each apply a different multisampling pattern to the same frame. That is, each GPU uses different sampling locations for sampling and rendering pixels in the same frame. The results of this sampling/rendering are then transferred across a bus (for example, a PCI-Express bus) from one GPU to the other, where the results are blended to generate a frame to be displayed. The end result is that the antialiasing sampling factor for the frame to be displayed is effectively doubled. For example, if each GPU performs 2× multisampling, the frame to be displayed includes 4× multisampling.

In regard to the foregoing method, the step in which the results are transferred across a bus from one GPU to another can create a bottleneck due to the limited amount of bandwidth available on the bus connecting the two GPUs. For example, in an implementation in which the bus is a PCI Express (PCIE) bus, bandwidth may be limited to about 1 Gigabit per second (Gb/sec). However, the amount of data being transferred across the bus in a system that implements this method is quite significant, particularly when the frame to be displayed is a high-resolution frame consisting of a large number of pixels. Furthermore, the foregoing method is inherently inefficient because, although multisampling-based antialiasing is a technique for edge enhancement, a significant amount of the data that is transferred between the two GPUs is not associated with edge pixels at all.

What is desired then is an improved method and apparatus for performing antialiasing in a graphics processing system that uses multiple GPUs. The improved method and apparatus should reduce the amount of data transferred between the multiple GPUs and/or improve the efficiency with which such data is transferred. The improved method and apparatus should further provide a means by which to distinguish between data that is associated with edge pixels and data that is not associated with edge pixels.

BRIEF SUMMARY OF THE INVENTION

The present invention provides an improved method and apparatus for performing antialiasing in a graphics processing system that uses multiple GPUs. The improved method and apparatus reduces the amount of data transferred between the multiple GPUs and improves the efficiency with which such data is transferred. The present invention also provides a means by which to distinguish between edge pixels and non-edge pixels in a rendered image.

A method in accordance with a particular embodiment of the present invention may be used to perform multisampling-based antialiasing in a system that includes a first GPU and a second GPU. The method includes rendering a first version of a frame in the first GPU using a first multisampling pattern and rendering a second version of the frame in the second GPU using a second multisampling pattern. Edge pixels are then identified in the second version of the frame. Pixels in the first version of the frame are then combined with only those pixels in the second version of the frame that have been identified as edge pixels to generate a combined frame.

A system in accordance with a particular embodiment of the present invention includes a first GPU configured to render a first version of a frame using a first multisampling pattern, a second GPU configured to render a second version of the frame using a second multisampling pattern, and a bus connecting the first GPU and the second GPU. The second GPU is further configured to identify edge pixels in the second version of the frame and to transfer only those pixels in the second version of the frame that have been identified as edge pixels over the bus to the first GPU. The first GPU is further configured to combine the pixels in the first version of the frame with the pixels transferred from the second GPU to generate a combined frame.

A method in accordance with a particular embodiment of the present invention may be used for identifying edge pixels in a rendered image that consists of a plurality of tiles, each of the plurality of tiles consisting of a plurality of pixels. The method includes accessing data to determine whether a selected tile in the plurality of tiles is fully compressed, identifying the selected tile as including only non-edge pixels responsive to a determination that the selected tile is fully compressed, and identifying the selected tile as including one or more edge pixels responsive to a determination that the selected tile is not fully compressed.

A method in accordance with a particular embodiment of the present invention may be used for performing multisampling-based antialiasing in a system that includes a first GPU and a second GPU. The method includes rendering a first version of a frame in the first GPU using a first multisampling pattern and rendering edge pixels associated with a second version of a frame in the second GPU using a second multisampling pattern. The edge pixels are then transferred from the second GPU to the first GPU. The edge pixels transferred from the second GPU are then combined with pixels in the first version of the frame to generate a combined frame.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 10A:
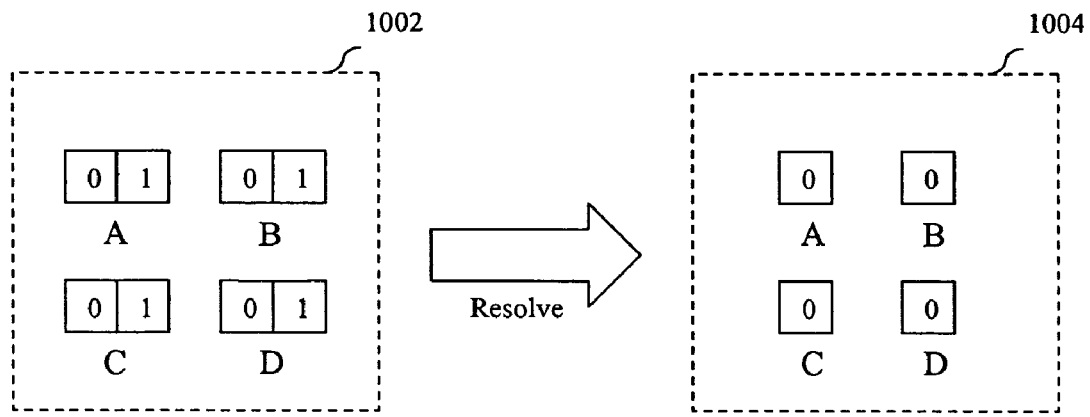
Figure 10B:
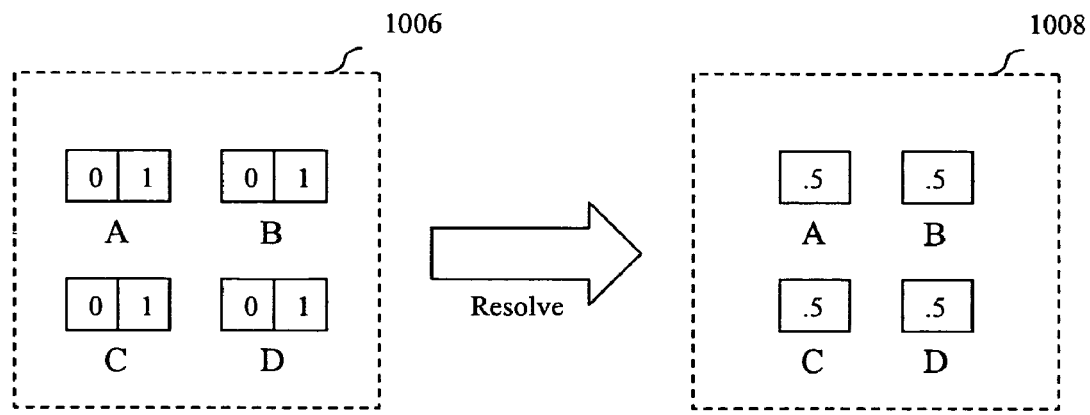

FIGS. 10A and 10B each illustrate the application of a resolve operation to a tile of pixels in a 2-sample edge detect antialiasing buffer in accordance with an embodiment of the present invention.

Figure 11:
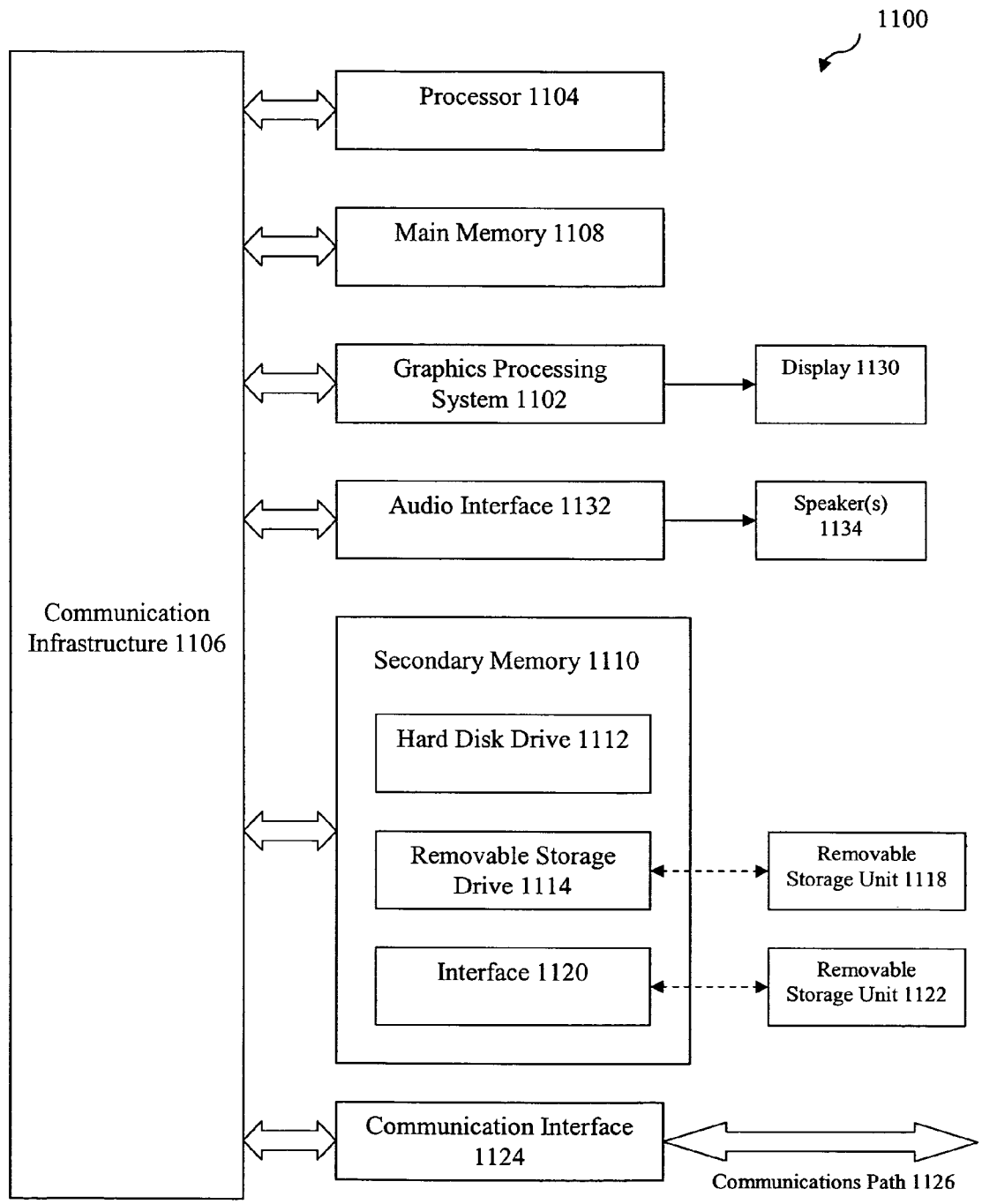

FIG. 11 depicts an example computer system that may be utilized to implement the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 1:
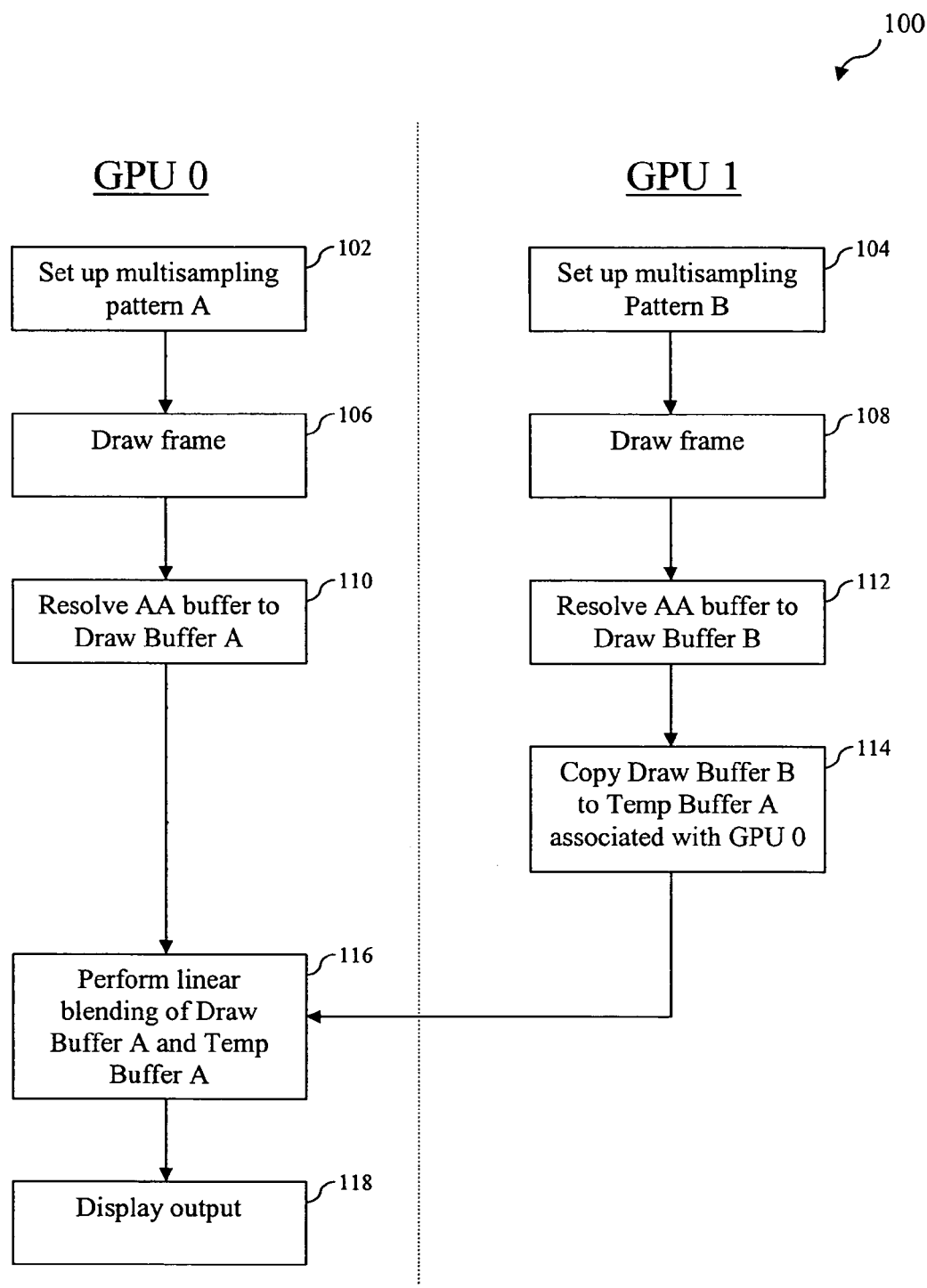
FIG. 1 is a flowchart of a method for performing antialiasing in a graphics processing system that includes multiple GPUs.

A. Method for Performing Antialiasing in a Graphics Processing System that Includes Multiple GPUs Flowchart 100 of FIG. 1 illustrates one method of performing antialiasing in a graphics processing system that includes multiple GPUs. In FIG. 1, the left hand side of the flowchart represents processing steps performed by a first GPU, denoted "GPU 0", while the right hand side represents processing steps performed by a second GPU, denoted "GPU 1". For the purposes of this example, it is assumed that each GPU has access to its own local memory for buffering data such as sample data that is used during the rendering process.

The first three processing steps performed by GPU 0 will now be described. First, at step 102, GPU 0 sets up a first pattern for multisampling each pixel in a frame to be drawn, wherein the pattern is denoted "multisampling pattern A". Second, at step 106, GPU 0 draws the frame, wherein drawing the frame includes storing multiple samples corresponding to each pixel in a multisample antialiasing (AA) buffer local to GPU 0. As used herein, the phrase "storing samples" refers to storing data, such as color values, associated with each of the samples. The multiple sampling locations for each pixel are selected based on the multisampling pattern A. Third, at step 110, GPU 0 resolves each set of multiple samples stored in the AA buffer to a single sample which is stored in a draw buffer local to GPU 0, denoted "Draw Buffer A". One method of resolving multiple samples to a single sample entails averaging the multiple samples in a linear space.

The first three processing steps performed by GPU 1 (steps 104, 108 and 112) are performed in parallel to the first three processing steps performed by GPU 0 and are essentially the same, except that a different multisampling pattern, denoted "multisampling pattern B", is used for drawing the frame, the sets of multiple samples are stored in an AA buffer that resides in memory local to GPU 1, and the frame is resolved to a draw buffer, denoted "Draw Buffer B", which also resides in memory local to GPU 1.

At step 114, GPU 1 copies the contents of Draw Buffer B to a temporary buffer in local memory of GPU 0, denoted "Temp Buffer A". At step 116, a compositor resident on the same graphics card as GPU 0 performs linear blending of each pixel represented in Draw Buffer A with a corresponding pixel represented in Temp Buffer A to generate a frame to be displayed. Alternatively, this linear blending may be performed by a compositor that is not resident on a graphics card, but is an independent component with which both GPU 0 and GPU 1 communicate. At step 118, the frame to be displayed is output to a display device. The frame has effectively twice the amount of multisampling as applied by each individual GPU.

In regard to the foregoing method, step 114 (in which the contents of Draw Buffer B are copied to Temp Buffer A) can create a bottleneck due to the limited amount of bandwidth available on the bus connecting GPU 0 to GPU 1. For example, in an implementation in which the bus is a PCI Express (PCE) bus, bandwidth may be limited to about 1 Gigabit per second (Gb/sec).

However, the amount of data being transferred across the bus in a system that implements the method of flowchart 100 is quite significant, particularly when the frame to be displayed is a high-resolution frame consisting of a large number of pixels. Furthermore, the foregoing method of flowchart 100 is inherently inefficient because, although multisampling-based antialiasing is a technique for edge enhancement, a significant amount of the data that is transferred between the two GPUs is not associated with edge pixels at all.

The following describes an improved method and apparatus for performing antialiasing in a graphics processing system that uses multiple GPUs. The improved method and apparatus reduces the amount of data transferred between the multiple GPUs and improves the efficiency with which such data is transferred. The improved method and apparatus further provide a means by which to distinguish between data that is associated with edge pixels and data that is not associated with edge pixels.

Figure 2:
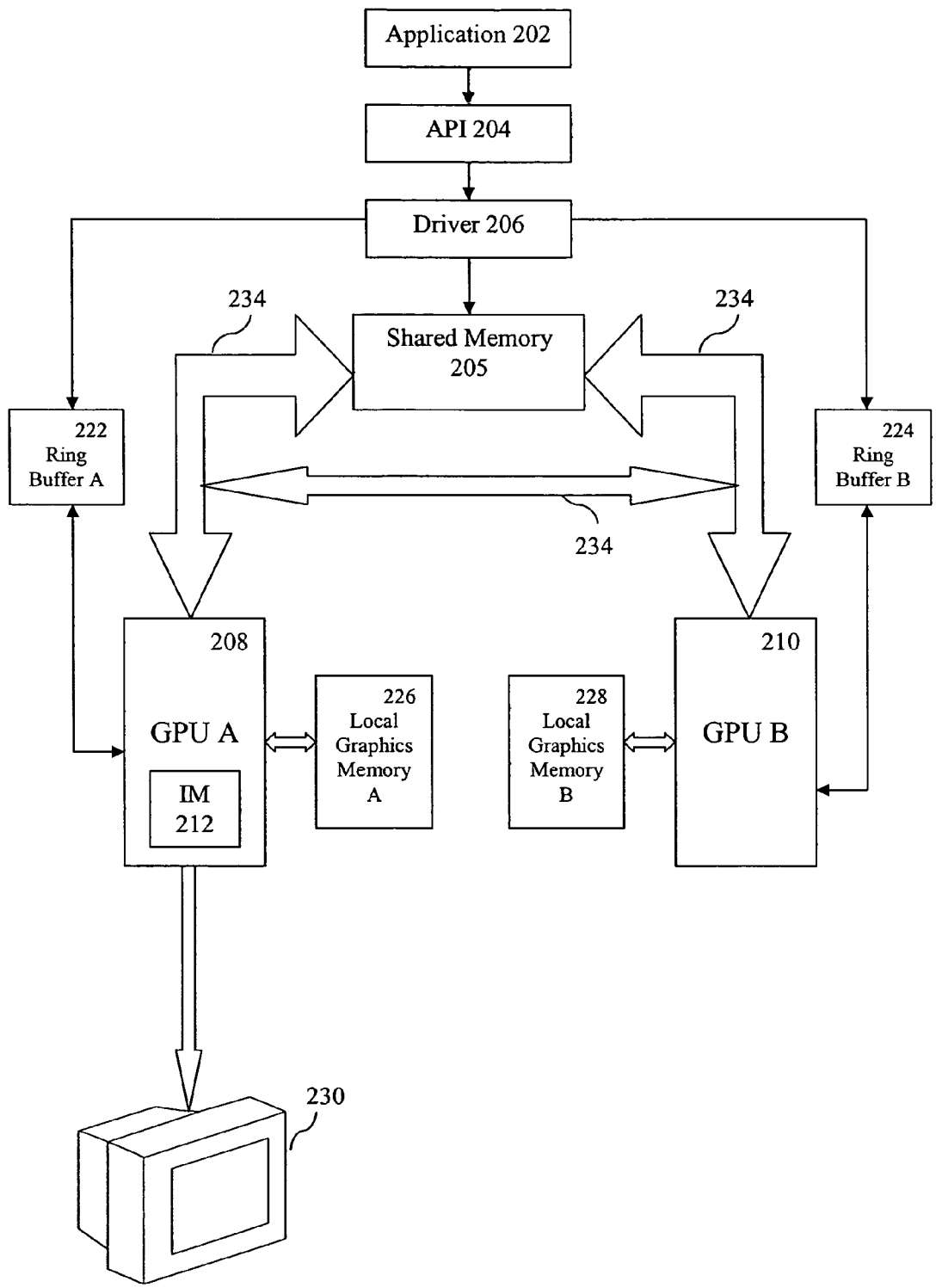
FIG. 2 is a block diagram of a graphics processing system that performs antialiasing in accordance with an embodiment of the present invention.

B. Graphics Processing System in Accordance with an Embodiment of the Present Invention FIG. 2 is a block diagram of an example graphics processing system 200 that uses multiple GPUs to perform antialiasing in accordance with an embodiment of the present invention. Graphics processing system 200 includes various software elements, such as an application 202, application programming interface (API) 204, and a driver 206, that are executed on a host computer system and interact with graphics hardware elements, such as a first GPU A 208 and a second GPU B 210, to render frames for output to a display 230. The graphics hardware elements reside on one or more graphics cards which are installed on the host computer system, although the invention is not so limited. The individual elements of system 200 will now be described in more detail.

As shown in FIG. 2, system 200 includes an application 202. Application 202 is an end user application that requires graphics processing capability, such as a video game application. Application 202 communicates with API 204. Several APIs are available for use in the graphics processing context. APIs were developed as intermediaries between application software, such as application 202, and graphics hardware on which the application software runs. With new chipsets and even entirely new hardware technologies appearing at an increasing rate, it is difficult for application developers to take into account, and take advantage of, the latest hardware features. It is also becoming impossible to write applications specifically for each foreseeable set of hardware. APIs prevent applications from having to be too hardware-specific. The application can output graphics data and commands to the API in a standardized format, rather than directly to the hardware. Examples of available APIs include DirectX® or OpenGL®. API 204 can be any one of the available APIs for running graphics applications.

API 204 communicates with a driver 206. Driver 206 is typically written by the manufacturer of the graphics hardware, and translates standard code received from the API into a native format understood by the graphics hardware. The driver also accepts input to direct performance settings for the graphics hardware. Such input may be provided by a user, an application or a process. For example, a user may provide input by way of a user interface (UI), such as a graphical user interface (GUI), that is supplied to the user along with driver 206. One performance setting that is of particular relevance to the embodiment described herein is a multisampling factor that the graphics hardware uses for performing antialiasing.

The graphics hardware includes two graphics processing units, GPU A 208 and GPU B 210. In this embodiment, GPU A 208 and GPU B 210 are graphics cards that each include a graphics processor and other associated hardware, although the invention is not so limited. Rather, as used herein, the term GPU broadly refers to any device, collection of devices, or subset of a device (e.g., a processing core within an integrated circuit chip) that is configured to perform graphics processing tasks.

Driver 206 issues commands and data to both GPU A 208 and GPU B 210. GPU A 208 and GPU B 210 receive the commands and data from driver 206 through respective ring buffers A 222 and B 224. The commands instruct GPU A 208 and GPU B 210 to perform a variety of operations on the data in order to ultimately produce a rendered frame for output to a display 230. As shown in FIG. 2, GPU A 208 and GPU B 210 each have access to a respective local graphics memory A 226 and B 228 for performing such operations. In addition, driver 206, GPU A 208, and GPU B 210 each have access to a shared memory 205. Communication between the GPUs and shared memory 205 is carried out over a PCI Express (PCEE) bus 234. In addition; GPU A 208 and GPU 210 B can communicate directly with each other using a peer-to-peer protocol over PCIE bus 234.

As will be described in more detail herein, the operations performed by GPU A 208 and GPU B 210 under the direction of driver 206 include a multisampling-based antialiasing operation. In accordance with this operation, each of GPU A 208 and GPU B 210 processes in parallel the same frame to be displayed. In particular, GPU A 208 and GPU B 210 each render a different version of the same frame through the respective application of different multisampling patterns, wherein the different multisampling patterns are selected by driver 206. In this embodiment, driver 206 is programmable to direct GPU A 208 and GPU B 210 to perform multisampling by a selectable multiplying factor.

In further accordance with this multisampling-based antialiasing operation, frame data resulting from the rendering process carried out by GPU B 210 is transferred to GPU A 208 over PCWE bus 234. A compositor, which is a component of an interlink module (IM) 212 resident on GPU A 208, operates to combine the frame data transferred from GPU B 210 with frame data generated by GPU A 208 via linear blending to obtain a final frame to be displayed. In the frame to be displayed, the multisampling factor is effectively multiplied by the number of GPUs. For example, if each GPU performs 2× multisampling, the frame to be displayed includes 4× multisampling.

As will be described in more detail herein, prior to transferring the frame data resulting from the rendering process over PCIE bus 234, GPU B 210 first performs an operation to identify edge pixels and non-edge (or "interior") pixels within the rendered frame. When the frame data is transferred from GPU B 210 to GPU A 208, sample data associated with edge pixels is transferred but sample data associated with non-edge pixels is not. Sample data associated with non-edge pixels can be excluded because the multisampling operations described herein are used for edge enhancement and thus impact the appearance of edge pixels only. As a result, the non-edge pixels in the frame rendered by GPU A 208 will be identical to the non-edge pixels in the frame rendered by GPU B 210. Consequently, there is no need to transfer and combine the data associated with these pixels.

The foregoing technique of transferring sample data associated with edge pixels from GPU B 210 to GPU A 208 but excluding sample data associated with non-edge pixels will be described in more detail below. The technique is advantageous because it operates to reduce the amount of data to be transferred across PCIE bus 234, thereby increasing the speed of the transfer operation such that that operation does not become a processing bottleneck. Additionally, by reducing the amount of data to be transferred across PCIE bus 234, more bandwidth is available for other components sharing the same bus.

It should be noted that example graphics processing system 200 has been described by way of example and is not intended to limit the present invention. Based on the teachings provided herein, persons skilled in the art will readily appreciate that the present invention can be implemented in any system in which multiple GPUs are in communication with each other and are used for performing antialiasing. Various systems of this type are described in detail in commonly-owned, co-pending U.S. patent application Ser. No. 11/140,156, entitled "Antialiasing System and Method" to Preetham et al., filed May 27, 2005, the entirety of which is incorporated by reference herein. Based on the teachings provided herein, a person skilled in the art would be capable of modifying each of the systems described in that application to perform the antialiasing techniques described herein.

Figure 3:
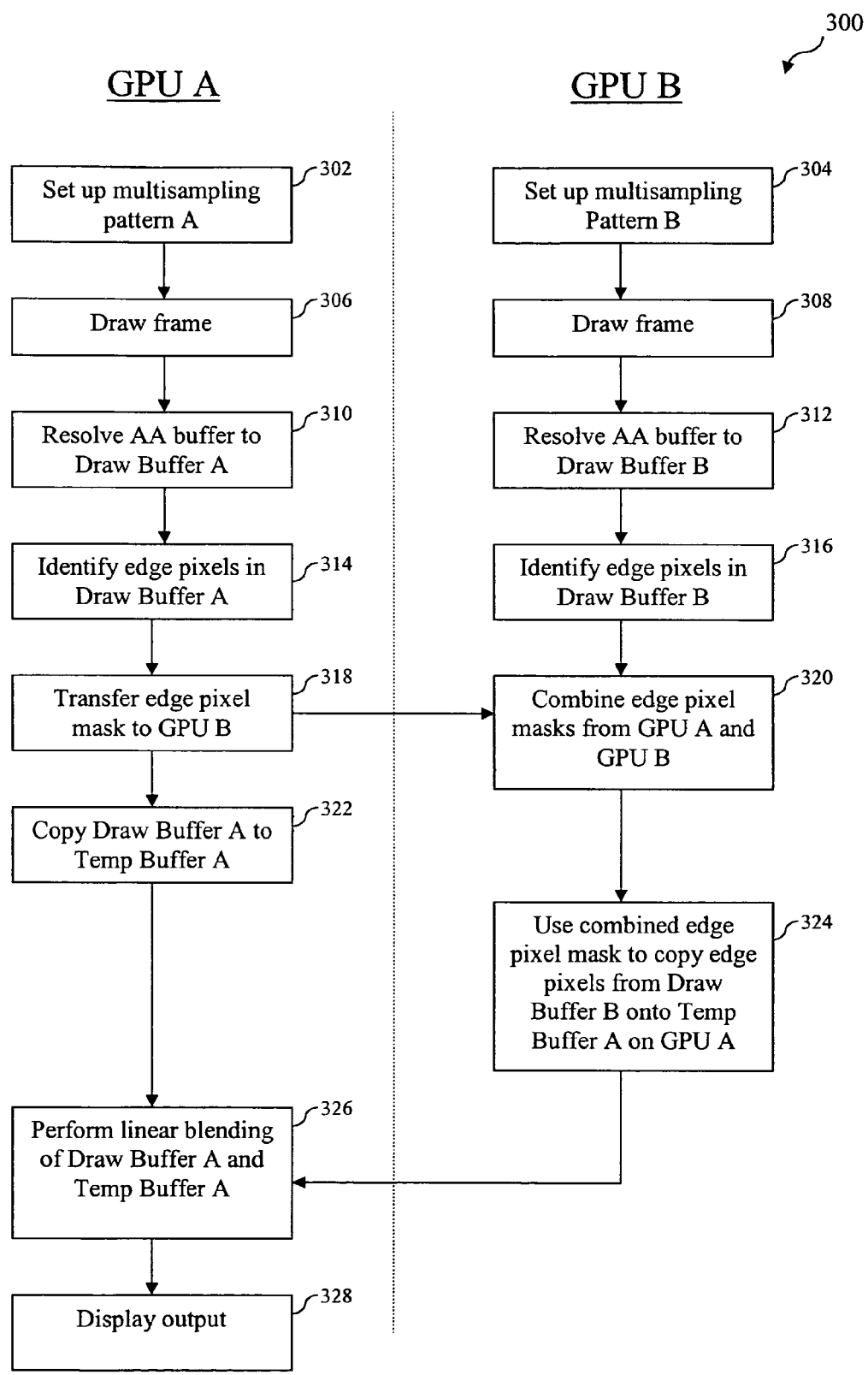
FIG. 3 is a flowchart of a method for performing antialiasing in a graphics processing system that includes multiple GPUs in accordance with an embodiment of the present invention.

C. Antialiasing Method in Accordance with an Embodiment of the Present Invention FIG. 3 is a flowchart of a method 300 for performing antialiasing in a graphics processing system that uses multiple GPUs in accordance with an embodiment of the present invention. Method 300 will be described with reference to the example graphics processing system 200 described above in reference to FIG. 2, although the invention is not so limited. In FIG. 3, the left hand side of the flowchart represents processing steps performed by GPU A 208, while the right hand side represents processing steps performed by GPU B 210.

Figure 4:
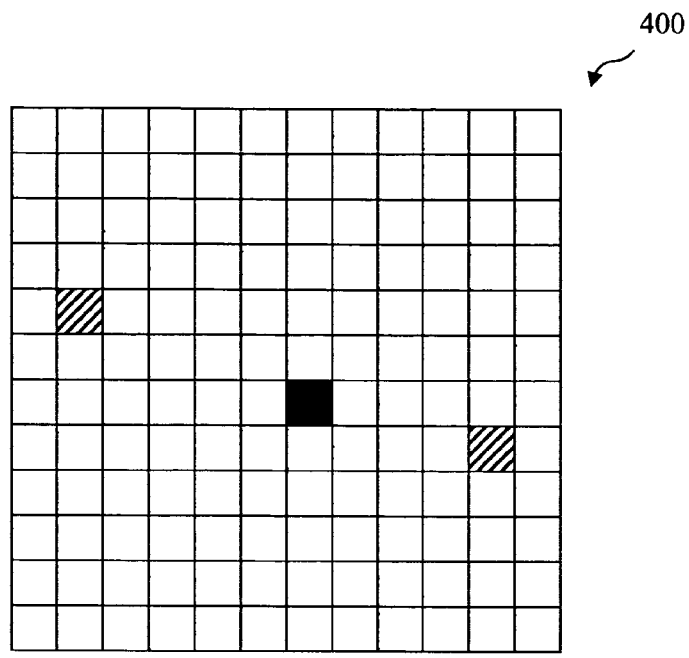
FIG. 4 is an example of a first multisampling pattern in accordance with an embodiment of the present invention.

The first four processing steps performed by GPU A 208 will now be described. At step 302, GPU A 208 sets up a first pattern for multisampling each pixel in a frame to be drawn, wherein the pattern is denoted "multisampling pattern A". FIG. 4 illustrates an example multisampling pattern 400 that may be used as multisampling pattern A. Multisampling pattern 400 provides for 2× multisampling of a pixel that consists of 12×12 sample locations. In FIG. 4, the center of the pixel is represented as a solid black box, and the sample locations selected for 2× multisampling are filled with slanted lines. Persons skilled in the art will readily appreciate a wide variety of other pixel dimensions and sample locations may be used.

At step 306, GPU A draws the frame, wherein drawing the frame includes storing the selected samples for each pixel in a multisample antialiasing (AA) buffer within local graphics memory A. As used herein, the phrase "storing a sample" encompasses storing data such as color data associated with a sample.

At step 310, GPU A 208 resolves each set of multiple samples stored in the AA buffer to a single sample in a draw buffer located within local graphics memory A 226, denoted "Draw Buffer A". One method for resolving multiple samples to a single sample entails averaging the multiple samples in a linear space, although the invention is not so limited. More details of this operation are provided in commonly-owned, co-pending U.S. patent application Ser. No. 11/140,156, entitled "Antialiasing Method and System" to Preetham et al., filed May 27, 2005, the entirety of which is incorporated by reference herein.

At step 314, GPU A 208 performs an operation to identify which pixels represented in Draw Buffer A are edge pixels. A particular method for performing this operation will be described in detail below with reference to FIGS. 7-9, 10A and 10B, although the invention is not limited to this particular method. The output of this operation is a set of data, referred to herein as an "edge pixel mask", that is stored in local graphics memory A 226 and identifies which pixels within the frame stored in Draw Buffer A are edge pixels. As used herein, the phrase "identifying edge pixels" may encompass either identifying edge pixels on a pixel-by-pixel basis or identifying a rectangular block or "tile" of pixels that includes at least one edge pixel.

The first four processing steps performed by GPU B 210 will now be described. Preferably, these first four steps are performed substantially in parallel with the first four processing steps performed by GPU A 210, although the invention is not so limited.

Figure 5:
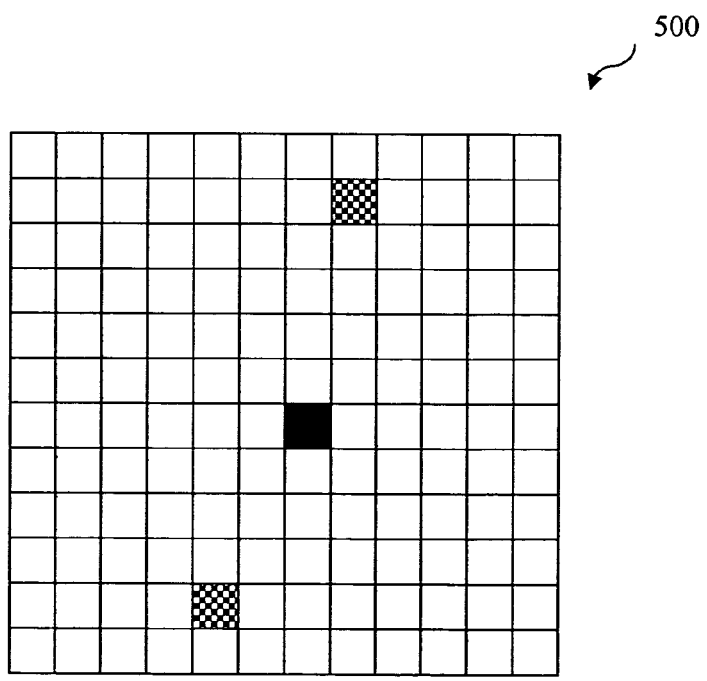
FIG. 5 is an example of a second multisampling pattern in accordance with an embodiment of the present invention.

The first three processing steps performed by GPU B 210 (steps 304, 308 and 312) are essentially the same as the first three processing steps performed by GPU A 208 (steps 302, 306 and 310), except that a different multisampling pattern, denoted "multisampling pattern B", is used for drawing the frame, the selected samples for each pixel are stored in an AA buffer which resides within local graphics memory B 228, and the frame is resolved to a draw buffer, denoted "Draw Buffer B", which resides in local graphics memory B 228. FIG. 5 illustrates an example multisampling pattern 500 that may be used as multisampling pattern B. Multisampling pattern 500 provides for 2× multisampling of a pixel that consists of 12×12 sample locations. In FIG. 5, the center of the pixel is represented as a solid black box, and the sample locations selected for 2× multisampling are filled with a checkerboard pattern.

At step 316, GPU B 210 performs an operation to identify which pixels represented in Draw Buffer B are edge pixels. A particular method for performing this operation will be described in detail below with reference to FIGS. 7-9, 10A and 10B, although the invention is not limited to this particular method. The output of this operation is an edge pixel mask that is stored in local graphics memory B 228 and identifies which pixels within the frame stored in Draw Buffer B are edge pixels.

At this point, GPU A 208 has generated an edge pixel mask that identifies which pixels within the frame stored in Draw Buffer A are edge pixels and GPU B 210 has generated an edge pixel mask that identifies which pixels with in the frame are stored in Draw Buffer B are edge pixels. At step 318, GPU A 208 transfers its edge pixel mask to GPU B 210 and, at step 320, the edge pixel mask from GPU A 208 is combined with the edge pixel mask from GPU B 210 in local memory to generate a combined edge pixel mask. This combined edge pixel mask is the union (as opposed to the intersection) of the individual edge pixel masks in that it identifies a pixel as an edge pixel if it has been identified as an edge pixel by either GPU A 208 or GPU B 210. In a preferred embodiment, the combination is carried out by overlaying the edge pixel mask transferred from GPU A 208 directly onto the edge pixel mask stored in local memory by GPU B 210, such that steps 318 and 320 are essentially combined into a single step.

At step 322, GPU A 208 stores a copy of the contents of Draw Buffer A in a temporary buffer (denoted "Temp Buffer A") located within local graphics memory A 226. At step 324, GPU B 210 transfers a copy of only those pixels in Draw Buffer B identified as edge pixels by the combined edge pixel mask across PCIE bus 234 to be overlaid onto the data stored in Temp Buffer A. In effect, GPU B 210 excludes or "masks out" from this transfer data corresponding to non-edge pixels as specified by the combined edge pixel mask. The net result of this processing step is that Temp Buffer A holds a complete representation of the frame rendered by GPU B 210. This is so because the non-edge pixels rendered by GPU A 208, a copy of which are present in Temp Buffer A and are not overlaid during step 318, are identical to the non-edge pixels rendered by GPU B 210, since the multisampling/resolve operation only alters the color of edge pixels.

The final two steps performed by GPU A 210 will now be described.

Figure 6:
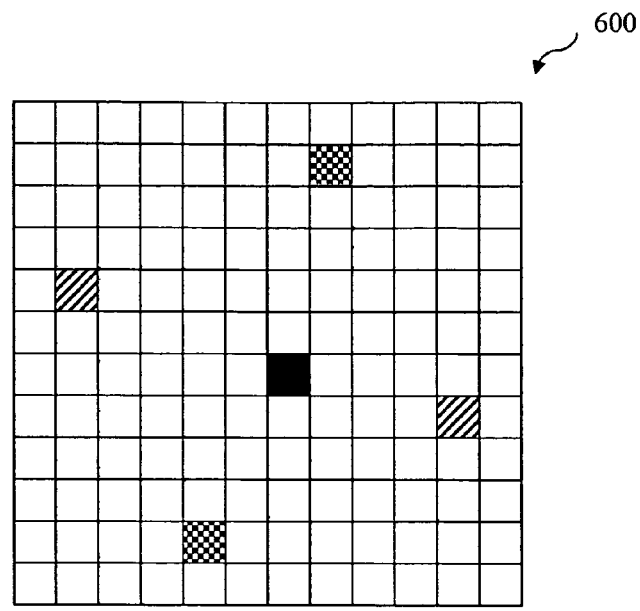
FIG. 6 is an example of a combined first and second multisampling pattern in accordance with an embodiment of the present invention.

At step 326, the compositor portion of IM 212, resident on the same graphics card as GPU A 208, performs linear blending of each pixel represented in Draw Buffer A with a corresponding pixel represented in Temp Buffer A to generate a frame to be displayed. At step 328, the frame to be displayed is output to display device 230. The frame has effectively twice the amount of multisampling as applied by each GPU. This is illustrated in FIG. 6, which shows the 4× multisampling pattern 600 that results from combining a pixel that uses 2× multisampling pattern 400 with a pixel that uses 2× multisampling pattern 500.

Because method 300 does not transfer sample data associated with non-edge pixels from GPU B 210 to GPU A 208, it advantageously reduces the amount of data to be transferred across PCIE bus 234. As a result, the speed of the transfer operation is increased such that the operation does not become a processing bottleneck. Furthermore, this method makes more bandwidth available for other components sharing the same bus.

D. Method of Identifying Edge Pixels in Accordance with an Embodiment of the Present Invention As discussed above in reference to the flowchart 300 of FIG. 3, GPU A 210 performs an operation at step 314 to identify edge pixels in the frame stored in Draw Buffer A and GPU B 210 performs an operation at step 316 to identify edge pixels in the frame stored in Draw Buffer B. In an embodiment, GPU A 208 and GPU B 210 each perform this operation using a memory internal to a graphics processor, referred to herein as a Tile Format Table (TFT), that keeps track of whether sample color data associated with each pixel in the frame to be displayed is fully compressed, partially compressed, or uncompressed. A full description of this compression scheme and the use of the TFT is set forth in commonly-owned, co-pending U.S. patent application Ser. No. 10/672,707, entitled "Method and Apparatus for Compression of Multi-Sampled Anti-Aliasing Color Data", filed Sep. 26, 2003, which is incorporated by reference as if fully set forth herein.

Figure 7:
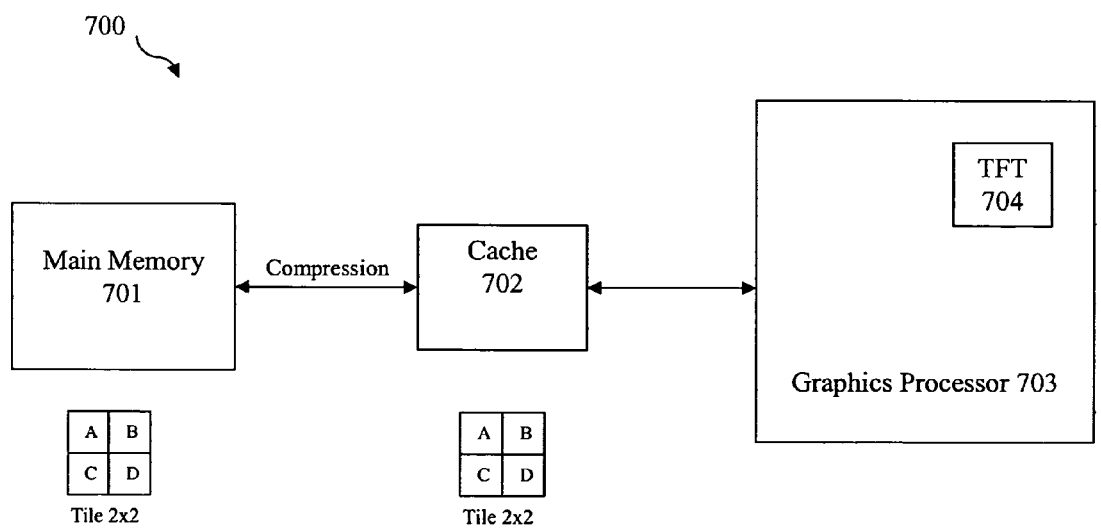
FIG. 7 illustrates an exemplary processor and memory configuration for compressing multisampled antialiased color data in accordance with an embodiment of the present invention.

1. Sample Color Data Compression in Accordance with an Embodiment of the Present Invention FIG. 7 illustrates an exemplary processor and memory configuration 700 in accordance with the teachings of U.S. patent application Ser. No. 10/672,707. In an embodiment of the present invention, this configuration is used by at least one GPU in a multi-GPU system and is leveraged to distinguish edge pixels from non-edge pixels in a manner that will be described in more detail below.

As shown in FIG. 7, a graphics processor 703 is communicatively connected to a cache 702, which in turn is communicatively connected to a main memory 701. During the process of rendering a frame for display, pixel data is transferred from main memory 701 to cache 702 for use by graphics processor 703. As set forth in U.S. patent application Ser. No. 10/672,707, pixel data is transferred as rectangular blocks or "tiles" of multiple adjacent pixels. In the example shown in FIG. 7, the pixels are transferred in 2×2 tiles of adjacent pixels, wherein the pixels are denoted A, B, C and D. However, as will be apparent to persons skilled in the art, other size tiles may be used.

Each pixel in the tile has been multisampled, and thus the data associated with each pixel includes a color value corresponding to each of the samples within the pixel. In one example set forth in U.S. patent application Ser. No. 10/672,707, each pixel includes four samples, and each sample is associated with a color value. The color value may be one word in length.

During the transfer from main memory 701 to cache 702, each tile is evaluated and, based on the results of the evaluation, color data associated with each pixel in the tile may be compressed. In accordance with an embodiment described in application Ser. No. 10/672,707, an evaluated tile may be handled in one of three ways: it may be "fully compressed", "partially compressed", or it may remain uncompressed.

Full compression is selected if all the samples in each multisampled pixel are the same color. This may occur, for example, if the tile is wholly covered by a single triangle. When a tile is fully compressed, only a single color value is stored for each pixel in the tile.

Figure 8:
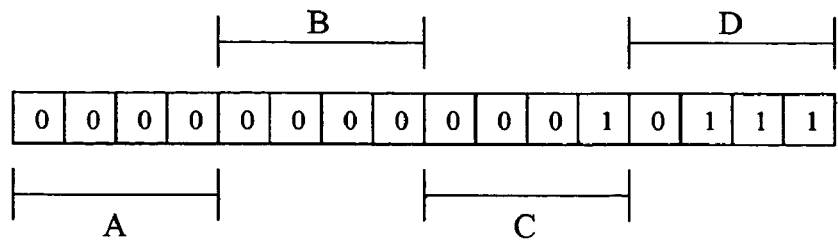
FIG. 8 is an example pointer format used for partially compressing multisampled antialiased color data in accordance with an embodiment of the present invention.

Partial compression is selected if all the samples in each multisampled pixel are one of only two colors. This may occur, for example, if the tile is covered by no more than two triangles. When a tile is partially compressed, two color values are stored for each pixel in the tile and a pointer is used to encode the compression. FIG. 8 illustrates the bits of an example pointer for a partially compressed 2×2 tile of 4× multisampled pixels A, B, C and D. Each bit in the pointer is either a "0", which means that a first color for that pixel is used (termed "the original color"), or a "1", which means that a second color for that pixel is used (termed "the replacement color"). For example, in pixel A, all four samples are of the original color for pixel A. Hence all four bits are encoded "0". In pixel C, the first three samples are of the original color for pixel C. Thus the first three bits are encoded "0". The last bit is encoded "1" to indicate that the fourth sample of pixel C is using the replacement color. The same logic applies for pixels B and D. Using this pointer, only two color values per pixel need to be stored, with one color value for the original color value and another for the replacement color.

Color data remains uncompressed if the sub-pixels in any of the multisampled pixels can be more than two colors. For example, this may occur if the tile is covered by more than two triangles. In this instance, a single color value is stored for each sample in each pixel in the tile.

In accordance with the teachings of application Ser. No. 10/627,707, graphics processor 703 includes an on-chip memory referred to as Tile Format Table (TFT) 704, to keep track of the format of the tile data stored in cache 702. Tiles stored in cache 702 are transferred to graphics processor 703 as needed for processing. The tiles need not be decompressed at graphics processor 703, because graphics processor 703 uses TFT 704 to keep track of the format of the incoming tiles. Graphics processor 703 can operate on the tile in its compressed format and thus speed up overall operation.

In one embodiment, there is a entry in TFT 704 for every tile in a given frame. Each entry has a two-bit compression encoding to indicate the format of the particular tile. In one embodiment, the two bits encode the following four states:

1. clear
2. fully compressed
3. partially compressed
4. uncompressed.

The two-bit compression encoding in the TFT alerts the processor as to the format of tile data coming from the cache. The first state indicates a state in which the cache is set to a "clear value" that corresponds to a default empty data state. The second, third and fourth states of the TFT entry describe the aforementioned three levels of compression for the tile: fully compressed, partially compressed, and uncompressed.

With the two-bit encoding, graphics processor 703 can appropriately process the tile data received from cache 702.

As noted above, both GPU A 208 and GPU B 210 in the embodiment depicted in FIG. 2 perform a resolve operation to combine multiple samples together to arrive at a single representative sample for a given pixel (see, for example, steps 310 and 312 in FIG. 3 and associated text). Put another way, during the resolve operation, data is pulled out from local memory and then written back into local memory with the result that only pixel data remains for each pixel (i.e., no sub-pixel or sample data remains).

Using the compression scheme described above, the resolve operation is performed more efficiently. The manner in which the resolve operation is performed depends on the level of compression of the tiles. First, if the tiles are fully compressed, i.e., there is already only one color per pixel, nothing needs to be done and each pixel in the tile is simply written back into memory. Second, if the tiles are partially compressed or uncompressed, i.e., there are different color samples within each pixel, then the samples are combined to resolve to the final pixel color. In one embodiment, samples with the same colors are only processed once. For example, for the tile represented by the pointer of FIG. 8, pixel C has three samples of one color and one sample of another color. The resolve operation will multiply the single color value associated with the first three samples by three and combine it with one times the color value of the remaining sample. Then, the combined value is divided by four to obtain the final pixel color value. This saves the process from having to read the same color value multiple times. For an uncompressed tile, the color values associated with each sample are added together and the result is divided by the number of samples in the traditional manner.

2. Use of Tile Format Table (TFT) and Resolve Operation to Distinguish Edge and Non-Edge Pixels in Accordance with an Embodiment of the Present Invention In an embodiment of the present invention, at least one GPU in a multi-GPU system leverages the TFT and resolve operation discussed in the foregoing section to distinguish between edge and non-edge pixels in a frame to be displayed. This distinction allows a GPU to avoid sending data associated with non-edge pixels to another GPU when performing multi-GPU based antialiasing operations as described elsewhere herein.

TFT 704 contains information about tiles in the frame to be displayed that are fully compressed, partially compressed, or uncompressed. When a tile is fully compressed, it is guaranteed that all of the pixels in that tile are interior or non-edge pixels. In contrast, when a tile is only partially compressed or uncompressed, this means that at least some of the pixels in that tile are edge pixels. Therefore, the information stored in TFT 704 can assist in determining whether a tile contains only non-edge pixels or contains one or more edge pixels. However, because TFT 704 is implemented as an on-chip memory of graphics processor 703, it is difficult to read directly.

Figure 9:
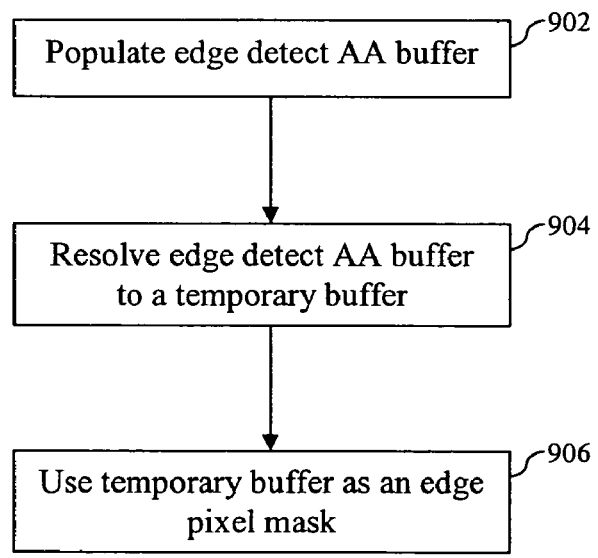
FIG. 9 illustrates a flowchart of a method for determining whether a tile contains only non-edge pixels or contains at least one edge pixel in accordance with an embodiment of the present invention.

FIG. 9 illustrates a flowchart 900 of a method for using the aforementioned resolve command to obtain information from TFT 704 for determining whether a tile contains only non-edge pixels or contains at least one edge pixel. The method of flowchart 900 may be used by GPU A 208 of FIG. 2 to perform step 314 of flowchart 300 and/or by GPU B 210 of FIG. 2 to perform step 316 of flowchart 300.

At step 902, an "edge detect" anti-aliasing (AA) buffer is populated in local graphics memory. The edge detect AA buffer is not populated with data representing the actual frame to be displayed (which is instead stored in Draw Buffer A or Draw Buffer B). Rather, the edge detect AA buffer is populated with predefined multisampled pixel data that, when resolved in accordance with data stored in TFT 704, will result in a certain color value if a tile entry in TFT 704 indicates a tile is fully compressed and will result in a different color value if a tile entry in TFT 704 indicates that a tile is partially compressed or uncompressed. Because the edge detect AA buffer does not contain data representing the actual frame to be displayed, it may also be thought of as a "dummy" buffer.

In accordance with an embodiment of the present invention, a 2-sample edge detect AA buffer is used that has the same dimensions and depth as the frame to be displayed. For each pixel in the 2-sample edge detect AA buffer, a "0" is stored in the first sample location and a "1" is stored in the second sample location. A 2-sample edge detect AA buffer can be used regardless of the sample depth of the Draw Buffer B in which the frame to be displayed is stored. Although a 2-sample edge detect AA buffer has been described by way of example herein, such description is not intended to limit the present invention and persons skilled in the art will appreciate that an edge detect AA buffer having a different sample depth (e.g., a 4-sample edge detect AA buffer) may also be used.

At step 904, GPU B 210 resolves the edge detect AA buffer using the data stored in TFT 704 to a temporary buffer, which resides in local graphics memory. To better explain this step, FIG. 10A illustrates the application of the resolve operation to a 2×2 tile of pixels 1002 in the 2-sample edge detect AA buffer described above, wherein an entry in TFT 704 indicates that a corresponding tile in the frame to be displayed is fully compressed. As shown in FIG. 10A, each pixel A, B, C and D in the 2×2 tile 1002 has 2 sample locations, wherein the first of the two sample locations has an assigned color value of "0" and the second of the two sample locations has an assigned color value of "1". After application of the resolve operation, each pair of samples is resolved into a corresponding representative sample in a resolved 2×2 tile 1004 within the temporary buffer. Because TFT 704 indicates that the corresponding tile in the frame to be displayed is compressed, graphics processor 703 applies the resolve command by assuming that the color value associated with the first sample location is also the color value for the second sample location, and thus the resolved sample color for each pixel is zero.

In contrast, FIG. 10B illustrates the application of the resolve operation to a 2×2 tile of pixels 1006 in the 2-sample edge detect AA buffer described above, wherein the relevant entry in TFT 704 indicates that a corresponding tile in the frame to be displayed is partially compressed or uncompressed. Just like tile 1002 of FIG. 10A, each pixel A, B, C, and D in tile 1006 has 2 sample locations, wherein the first of the two sample locations has an assigned color value of "0" and the second of the two sample locations has an assigned color value of "1". After application of the resolve operation, each pair of samples is resolved into a corresponding representative sample in a resolved 2×2 tile 1008 within the temporary buffer. Because TFT 704 indicates that the corresponding tile in the frame to be displayed is partially compressed or uncompressed, the application of the resolve command by graphics processor 702 involves averaging the color value associated with the first sample location with the color value for the second sample location. As a result, at least one of the resulting color values for each pixel in resolved tile 1008 will be non-zero. FIG. 10B illustrates one example in which each of the pixels in the corresponding tile in the frame to be displayed is an edge pixel. As a result, each color value for each pixel in resolved tile 1008 is non-zero.

At step 906, the data stored in the temporary buffer is used as an edge pixel mask. As described above in reference to FIG. 3, each of GPU A 208 and GPU B 210 generate such an edge pixel mask. The edge pixel mask generated by GPU A 208 is combined with the edge pixel mask generated by GPU B 210 by overlaying the former edge pixel mask onto the latter one. The combined edge pixel mask is then used for copying tiles from the frame stored in Draw Buffer B onto Temp Buffer A located in local graphics memory A 226. If a tile in the combined edge pixel mask has all zero color values, then a corresponding tile in Draw Buffer B is "masked out," or excluded, from copying from Draw Buffer B onto Temp Buffer A. In contrast, if a tile in the combined edge pixel mask has at least one non-zero color value, then the corresponding tile in Draw Buffer B is "passed through" or copied from Draw Buffer B onto Temp Buffer A. The net result of this step is that only tiles within Draw Buffer B that include one or more edge pixels or that correspond to tiles within Draw Buffer A that include one or more edge pixels are copied from Draw Buffer B onto Temp Buffer A. Note that in an embodiment in which TFT 704 does not include an entry for each tile in the frame to be displayed, tiles without entries should be treated as if they encompass edge pixels and should be transferred in their entirety from Draw Buffer B onto Temp Buffer A.

As noted above, an implementation of the present invention allocates a 2-sample edge detect AA buffer of the dimensions and depth of the render target. However, such an implementation could consume a significant amount of memory resources. Accordingly, an alternate implementation uses a 2-sample edge detect AA buffer having smaller dimensions than the render target. For example, the 2-sample edge detect AA buffer may be only 128×128 pixels. In accordance with such an implementation, step 904 is repeated multiple times, effectively sliding the resolve "window" to generate each 128×128 portion of the temporary buffer. Another alternative implementation uses a small 2-sample edge detect AA buffer and memory mapping hardware is used to map this buffer onto the larger resolve buffer (i.e., the temporary buffer).

In a particular embodiment of the present invention, to reduce the amount of data sent between GPU A 208 and GPU B 210 in step 318 of flowchart 300 of FIG. 3, the edge pixel masks generated by GPU A 208 and GPU B 210 are placed in a highly-compressed data format. For example, assume that the temporary buffer that stores the edge pixel mask for GPU A 208 is 32 bits per pixel (bpp). In accordance with an example implementation that uses 2×2 tiles, and in which the graphics hardware cannot easily tell which pixel(s) within each 2×2 tile is (are) the edge pixel(s), this buffer is downsampled so that each 2×2 tile is represented by a single pixel. Pixels that are black will then correspond to 2×2 tiles that include no edge pixels. While downsampling, a format conversion is also be carried out from 32 bpp to 8 bpp to conserve bandwidth later. A second downsampling is then be performed so that a single pixel now corresponds to a 4×4 tile in the original edge pixel mask. This is desirable in an implementation in which compression is carried out on 4×4 tiles and pixels within a single tile are all encoded in a similar manner in the original AA buffer. This doubly-dowsampled and converted buffer is then used as the edge pixel mask that is transferred from GPU A 208 to GPU B 210 in step 318. Of course, only pixels that are non-zero are transferred as such non-zero pixels represent 4×4 tiles having edges. The target of this transfer is a temporary buffer that contains GPU B 210's own doubly-downsampled and converted edge pixel mask such that GPU A 208's edges are added to GPU B 210's edges. This overlaying results in the combined edge pixel mask that is used to transfer color data from GPU B 210 to GPU A 208 in step 324 of flowchart 300 of FIG. 3.

It should be noted that the usefulness of the aforementioned method of distinguishing edge pixels from non-edge pixels is not limited to performing multisampling-based anti-aliasing in a multi-GPU system. For example, the method may be advantageously used in any image processing system that seeks to efficiently identify and enhance edges in a rendered image. Furthermore, the method could be used to collect statistics concerning the number of edges in a given frame. These examples are not intended to be limiting, and other applications of the aforementioned method will by readily apparent to persons skilled in the art.

E. Example Computer System Implementation

FIG. 11 depicts an example computer system 1100 that may be utilized to implement the present invention. Example computer system 1100 could comprise for example, a standard personal computer (PC) based system or a mobile device such as a notebook or handheld computing device. However, the following description of computer system 1100 is provided by way of example only and is not intended to be limiting.

As shown in FIG. 11, example computer system 1100 includes a processor 1104 for executing software routines. Although a single processor is shown for the sake of clarity, computer system 1100 may also comprise a multi-processor system. Processor 1104 is connected to a communication infrastructure 1106 for communication with other components of computer system 1100. Communication infrastructure 1106 may comprise, for example, a communications bus, cross-bar, or network.

Computer system 1100 further includes a main memory 1108, such as a random access memory (RAM), and a secondary memory 1110. Secondary memory 1110 may include, for example, a hard disk drive 1112 and/or a removable storage drive 1114, which may comprise a floppy disk drive, a magnetic tape drive, an optical disk drive, or the like. Removable storage drive 1114 reads from and/or writes to a removable storage unit 1118 in a well known manner. Removable storage unit 1118 may comprise a floppy disk, magnetic tape, optical disk, or the like, which is read by and written to by removable storage drive 1114. As will be appreciated by persons skilled in the relevant art(s), removable storage unit 1118 includes a computer usable storage medium having stored therein computer software and/or data.

In an alternative implementation, secondary memory 1110 may include other similar means for allowing computer programs or other instructions to be loaded into computer system 1100. Such means can include, for example, a removable storage unit 1122 and an interface 1120. Examples of a removable storage unit 1122 and interface 1120 include a program cartridge and cartridge interface (such as that found in video game console devices), a removable memory chip (such as an EPROM or PROM) and associated socket, and other removable storage units 1122 and interfaces 1120 which allow software and data to be transferred from the removable storage unit 1122 to computer system 1100.

Computer system 1100 also includes at least one communication interface 1124. Communication interface 1124 allows software and data to be transferred between computer system 1100 and external devices via a communication path 1126. In particular, communication interface 1124 permits data to be transferred between computer system 1100 and a data communication network, such as a public data or private data communication network. Examples of communication interface 1124 can include a modem, a network interface (such as Ethernet card), a communication port, and the like. Software and data transferred via communication interface 1124 are in the form of signals which can be electronic, electromagnetic, optical or other signals capable of being received by communication interface 1124. These signals are provided to the communication interface via communication path 1126.

As shown in FIG. 11, computer system 1100 includes an audio interface 1132 for performing operations for playing audio content via associated speaker(s) 1134.

Computer system 1100 further includes a graphics processing system 1102 which performs operations for rendering images to an associated display 1130. Graphics processing system 1102 may include the graphics hardware elements described above in reference to FIG. 2, such as a first GPU A 208 and a second GPU B 210, although the invention is not so limited. In an embodiment, graphics processing system 1102 is configured to perform the features of the present invention, such as the steps of flowchart 300 of FIG. 3 and/or the steps of flowchart 900 of FIG. 9. Graphics processing system 1102 may perform these steps under the direction of computer programs being executed by processor 1104 and/or under the direction of computer programs being executed by one or more graphics processors within graphics processing system 1102.

As used herein, the term "computer program product" may refer, in part, to removable storage unit 1118, removable storage unit 1122, a hard disk installed in hard disk drive 1112, or a carrier wave carrying software over communication path 1126 (wireless link or cable) to communication interface 1124. A computer useable medium can include magnetic media, optical media, or other recordable media, or media that transmits a carrier wave or other signal. These computer program products are means for providing software to computer system 1100.

Computer programs (also called computer control logic) may be stored in main memory 1108, secondary memory 1110, or in a memory within graphics processing system 1102. Computer programs can also be received via communication interface 1124. Such computer programs, when executed, enable the computer system 1100, and in particular graphics processing system 1102, to perform one or more features of the present invention as discussed herein. In particular, the computer programs, when executed, enable the computer system 1100, and in particular graphics processing system 1102, to perform features of the present invention. Accordingly, such computer programs represent controllers of the computer system 1100.

Software for implementing the present invention may be stored in a computer program product and loaded into computer system 1100 using removable storage drive 1114, hard disk drive 1112, or interface 1120. Alternatively, the computer program product may be downloaded to computer system 1100 over communications path 1126. The software, when executed by the processor 1104 and/or by components within graphics processing system 1102, causes those elements to perform functions of the invention as described herein.

F. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for performing multisampling-based anti-aliasing in a system that includes a first graphics processing unit (GPU) and a second GPU comprising:
   rendering a first version of a frame in the first GPU using a first multisampling pattern;
   rendering a second version of the frame in the second GPU using a second multisampling pattern;
   identifying edge pixels in the second version of the frame; and
   combining pixels in the first version of the frame with only those pixels in the second version of the frame that have been identified as edge pixels to generate a combined frame.

2. The method of claim 1, wherein rendering the first version of the frame in the first GPU using the first multisampling pattern comprises:
   sampling each pixel in the frame in accordance with the first multisampling pattern to obtain multiple first samples for each pixel; and
   resolving the multiple first samples for each pixel to generate the pixels of the first version of the frame.

3. The method of claim 2, wherein rendering the second version of the frame in the second GPU using the second multisampling pattern comprises:
   sampling each pixel in the frame in accordance with the second multisampling pattern to obtain multiple second samples for each pixel; and
   resolving the multiple second samples for each pixel to generate the pixels of the second version of the frame.

4. The method of claim 1, wherein identifying edge pixels in the second version of the frame comprises:
   accessing data indicating whether or not a pixel in the second version of the frame is compressed; and
   if the accessed data indicates that the pixel in the second version of the frame is not compressed, identifying the pixel in the second version of the frame as an edge pixel.

5. The method of claim 1, wherein combining pixels in the first version of the frame with only those pixels in the second version of the frame that have been identified as edge pixels comprises:
   generating a mask based on compression data associated with the pixels in the second version of the frame;
   applying the mask to the second version of the frame; and
   transferring only those pixels in the second version of the frame that are not covered by the mask over a bus for combination with the pixels in the first version of the frame.

6. The method of claim 1, wherein combining pixels in the first version of the frame with only those pixels in the second version of the frame that have been identified as edge pixels comprises:
   linearly blending pixels in the first version of the frame with only those pixels in the second version of the frame that have been identified as edge pixels.

7. A graphics processing system, comprising:
   a first graphics processing unit (GPU) configured to render a first version of a frame using a first multisampling pattern;
   a second graphics processing unit (GPU) configured to render a second version of the frame using a second multisampling pattern; and
   a bus connecting the first GPU and the second GPU;

wherein the second GPU is further configured to identify edge pixels in the second version of the frame and to transfer only those pixels in the second version of the frame that have been identified as edge pixels over the bus to the first GPU, and wherein the first GPU is further configured to combine the pixels in the first version of the frame with the pixels transferred from the second GPU to generate a combined frame.

8. The system of claim 7, wherein the bus comprises a PCI-Express bus.

9. The system of claim 7, wherein the first GPU is configured to sample each pixel in the frame in accordance with the first multisampling pattern to obtain multiple first samples for each pixel and to resolve the multiple first samples for each pixel to generate the pixels of the first version of the frame.

10. The system of claim 9, wherein the second GPU is configured to sample each pixel in the frame in accordance with the second multisampling pattern to obtain multiple second samples for each pixel and to resolve the multiple second samples for each pixel to generate the pixels of the second version of the frame.

11. The system of claim 7, wherein the second GPU comprises:
   a memory;
   wherein the second GPU is further configured to access a table stored in the memory and to identify a pixel in the second version of the frame as an edge pixel if the table indicates that the pixel in the second version of the frame is not compressed.

12. The system of claim 7, wherein the second GPU is further configured to generate a mask based on compression data associated with the pixels in the second version of the frame, to apply the mask to the second version of the frame, and to transfer only those pixels in the second version of the frame that are not covered by the mask over the bus to the first GPU.

13. The system of claim 7, wherein the first GPU includes a compositor, the compositor configured to linearly blend pixels in the first version of the frame with the pixels transferred from the second GPU to generate the combined frame.

14. A method for performing multisampling-based antialiasing in a system that includes a first graphics processing unit (GPU) and a second GPU comprising:
   rendering a first version of a frame in the first GPU using a first multisampling pattern;
   rendering edge pixels associated with a second version of a frame in the second GPU using a second multisampling pattern;
   transferring the edge pixels from the second GPU to the first GPU; and
   combining only the edge pixels transferred from the second GPU with pixels in the first version of the frame to generate a combined frame.

15. A tangible computer useable medium having stored control for causing a first graphics processing unit (GPU) and a second GPU to perform multisampling-based antialiasing, the control logic comprising:
   first computer readable program code means for causing the first GPU to render a first version of a frame in using a first multisampling pattern;
   second computer readable program code means for causing a second GPU to render a second version of the frame using a second multisampling pattern;
   third computer readable program code means for causing the second GPU to identify edge pixels in the second version of the frame; and
   fourth computer readable program code means for causing the first GPU and/or the second GPU to combine pixels in the first version of the frame with only those pixels in the second version of the frame that have been identified as edge pixels to generate a combined frame.

* * * * *

UNITED STATES PATENT AND TRADEMARK OFFICE
CERTIFICATE OF CORRECTION

PATENT NO. : 7,612,783 B2
APPLICATION NO. : 11/429078
DATED : November 3, 2009
INVENTOR(S) : Koduri et al.

It is certified that error appears in the above-identified patent and that said Letters Patent is hereby corrected as shown below:

Column 18, line 19, after "control" please add --logic--.

Signed and Sealed this

Twenty-third Day of February, 2010

David J. Kappos
*Director of the United States Patent and Trademark Office*